(12) United States Patent
Miyoshi et al.

(10) Patent No.: US 8,146,437 B2
(45) Date of Patent: Apr. 3, 2012

(54) DIAPHRAGM STRUCTURE AND MEMS DEVICE

(75) Inventors: Yuichi Miyoshi, Niigata (JP); Yusuke Takeuchi, Kanagawa (JP); Tohru Yamaoka, Osaka (JP); Hiroshi Ogura, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/630,179

(22) Filed: Dec. 3, 2009

(65) Prior Publication Data

US 2010/0077863 A1  Apr. 1, 2010

Related U.S. Application Data

(63) Continuation of application No. PCT/JP2007/073881, filed on Dec. 11, 2007.

(30) Foreign Application Priority Data

Jun. 22, 2007 (JP) .................. 2007-164647

(51) Int. Cl.
G01L 9/06 (2006.01)
(52) U.S. Cl. .................... 73/727; 73/715; 361/283.4
(58) Field of Classification Search .................. None
See application file for complete search history.

(56) References Cited

U.S. PATENT DOCUMENTS

| | | | |
|---|---|---|---|
| 5,146,435 A * | 9/1992 | Bernstein | 367/181 |
| 5,289,721 A | 3/1994 | Tanizawa et al. | |
| 5,569,855 A * | 10/1996 | Schomburg et al. | 73/700 |
| 5,793,073 A | 8/1998 | Kaminishi et al. | |
| 6,455,793 B1 * | 9/2002 | Kasahara et al. | 200/86 R |
| 6,898,842 B2 * | 5/2005 | Kasahara et al. | 29/622 |
| 7,373,835 B2 * | 5/2008 | Matsubara | 73/756 |
| 7,377,175 B2 * | 5/2008 | Matsubara | 73/715 |
| 2001/0052266 A1 | 12/2001 | Murata et al. | |
| 2004/0056560 A1 | 3/2004 | Wang et al. | |
| 2006/0027529 A1 | 2/2006 | Tokunaga | |
| 2009/0074211 A1 | 3/2009 | Hirade et al. | |

FOREIGN PATENT DOCUMENTS

| | | |
|---|---|---|
| JP | 60-138434 | 7/1985 |
| JP | 08-233765 | 9/1996 |
| JP | 10-073505 | 3/1998 |
| JP | 2002-223499 | 8/2002 |
| JP | 2007-067659 | 3/2007 |

OTHER PUBLICATIONS

International Search Report issued in International Application No. PCT/JP2009/001970 dated Jul. 5, 2010.
Extended European Search Report issued in European Patent Application No. EP 07859774.7 dated Sep. 15, 2011.

* cited by examiner

Primary Examiner — Lisa Caputo
Assistant Examiner — Jermaine Jenkins
(74) Attorney, Agent, or Firm — McDermott Will & Emery LLP

(57) ABSTRACT

A diaphragm structure for a MEMS device includes a through-hole formed so as to penetrate from an upper surface to a bottom surface of a substrate; and a vibrating electrode film formed on the upper surface of the substrate so as to cover the through-hole. An opening shape of the through-hole in the upper surface of the substrate is substantially hexagonal.

14 Claims, 3 Drawing Sheets

US 8,146,437 B2

DIAPHRAGM STRUCTURE AND MEMS DEVICE

CROSS-REFERENCE TO RELATED APPLICATION

This is a continuation of PCT International Application PCT/JP2007/073881 filed on Dec. 11, 2007, which claims priority to Japanese Patent Application No. 2007-164647 filed on Jun. 22, 2007. The disclosures of these applications including the specifications, the drawings, and the claims are hereby incorporated by reference in its entirety.

BACKGROUND

The present disclosure relates to a MEMS device such as a sensor utilizing a MEMS (Micro Electro Mechanical Systems) technique, and relates to, e.g., an acoustic sensor which has a diaphragm vibrating by detecting a pressure variation, and which converts such vibration into an electrical signal.

Recently, a technology called "MEMS" has been developed by utilizing microfabrication techniques used in a field of fabricating semiconductor LSIs such as silicon. Various micro-components such as acceleration sensors, pressure sensors, and acoustic sensors have been proposed and commercialized by utilizing the MEMS technique.

As disclosed in, e.g., Patent Documents 1 and 2, these MEMS devices such as sensors utilizing the MEMS technique includes a structure which has a diaphragm to be a vibrating region (hereinafter referred to as a "diaphragm structure") in order to detect an acceleration or pressure variation.

A diaphragm structure in a conventional MEMS device will be explained hereinafter with reference to FIGS. 3(a)-3(c). FIG. 3(a) is a top view of the diaphragm structure in the conventional MEMS device. FIG. 3(b) is a cross-sectional view of the diaphragm structure in the conventional MEMS device. FIG. 3(c) is a bottom view of the diaphragm structure in the conventional MEMS device.

As shown in FIG. 3(a)-3(c), the diaphragm structure in the conventional MEMS device is a structure in which a thin film 303 is formed on a substrate 301 having a through-hole 302, and a portion of the thin film 303, which is positioned on the through-hole 302, functions as a diaphragm 304. The diaphragm 304 vibrates depending on an acceleration or pressure variation, and thereby utilizing the diaphragm 304 for MEMS devices such as various sensors by electrically detecting such vibration displacement.

As the substrate 301, a silicon substrate is generally used, but a (100) plane oriented silicon substrate is particularly used. A mask film is patterned and formed onto the (100) plane oriented silicon substrate, and is etched with alkali such as KOH. While etching the (100) plane, a (111) plane which has an etching rate 50-100 times slower than that of the (100) plane is exposed. Hence, an anisotropic wet etching can be performed with a good dimensional controllability. As shown in FIGS. 3(a) and 3(c), when continuing the etching until the through-hole 302 penetrates the silicon substrate 301, the square diaphragm 304 is formed. As inner walls of the through-hole 302, (111) inclined surfaces 305 having an angle of 54.7 degrees with respect to the (100) plane.

Patent Document 2 discloses a square diaphragm formed by using a (110) plane oriented silicon substrate instead of using the (100) plane oriented silicon substrate.

PATENT DOCUMENT 1: Japanese Patent Publication No. 60-138434

PATENT DOCUMENT 2: Japanese Patent Publication No. 2002-223499

PATENT DOCUMENT 3: Japanese Patent Publication No. 2007-67659

SUMMARY

However, in the diaphragm structure used in the conventional MEMS device, there is a problem in which a stress concentration is generated at four corners of the diaphragm due to the square shape of the diaphragm, and such stress concentration results in a non-uniform vibration characteristic, or in which a breakage of the diaphragm is caused at the corners where the stress concentration is generated during fabricating or using the diaphragm.

In addition, in the diaphragm structure used in the conventional MEMS device, a chip size is obtained by adding a size (dimension) of the diaphragm to a dimension of the (111) inclined portion of the inner walls of the through-hole and a dimension of a base portion (a portion where the through-hole is not formed) of the silicon substrate. Hence, in order to fabricate the diaphragm having a desired size, there is a problem in which the actual chip size is required to be approximately several times larger than the diaphragm size. When fabricating the diaphragm having, e.g., the dimension of 1.0 mm, it is necessary to add the diaphragm size to the (111) inclined portion width of 443 μm (in a case of the silicon substrate having the diameter of 6 inch and the thickness of 625 μm) and the silicon substrate base portion width of 200 μm per side of the diaphragm. Consequently, the actual chip size is 2.29 mm (=1.0 mm+443 μm×2+200 μm×2), and has to be 2.3 times (5.2 times at the area ratio) larger than the diaphragm size. As described above, in the diaphragm structure used in the conventional sensor, there is a problem in which a low effective area ratio of the diaphragm to the chip area becomes an obstacle to a chip miniaturization for realizing downsizing or cost reduction.

Further, such problems become exacerbated with an increase in substrate thickness associated with an increase in wafer diameter. In a case of, e.g., a 6-inch silicon wafer (the thickness of 625 μm), the (111) inclined portion width is 443 μm. On the other hand, in a case of a 8-inch wafer (the thickness of 725 μm), the (111) inclined portion width is increased to 513 μm by 71 μm. Hence, the total of the (111) inclined portion widths of both sides of the diaphragm is increased from 885 μm to 1027 μm by 142 μm. That is to say, when increasing the wafer diameter from 6 inch to 8 inch, the chip size has to increase by 142 μm, and this results in a major obstacle to the increase in wafer diameter in order to realize cost reduction.

As a technique for forming a through-hole in a silicon substrate, a method by a dry etching (generally called "Deep-RIE (reactive ion etching)") has been proposed instead of an alkali wet etching method utilizing a plane orientation of a silicon substrate, and Patent Document 3, etc. disclose a MEMS sensor using a diaphragm formed by the dry etching method. By using the Deep-RIE method, diaphragm shapes other than square can be formed. In addition, a through-hole which has vertical inner walls without the (111) inclined surfaces can be formed, and thereby preventing the increase in chip size due to the (111) inclined surfaces.

However, according to the Deep-RIE method, an etching rate of silicon is at most approximately 10 μm/min. Hence, it takes 75 min (=625 μm×1.2/(10 μm/min), in a case of a 20% over etching) per wafer to form a hole penetrating a wafer having, e.g., the diameter of 6 inch and the thickness of 625 μm, and it requires approximately 30 hours for 25 pieces per lot. In order to compensate for the low production capacity, it is necessary to prepare a plurality of Deep-RIE devices which cost 1-2 hundred million yen per device, and therefore there is a problem in which the Deep-RIE method is high cost. Configuration of a silicon substrate frame with only base portion provided with no (111) inclined portions by using the Deep-RIE method poses a new problem in which a strength of a chip itself is reduced.

In view of the above, it is an object of the present disclosure to provide an excellent diaphragm structure which prevents a stress concentration at diaphragm corners, an increase in chip size, and a reduction in chip strength, and which can improve an effective area ratio of a diaphragm to a chip area, and a MEMS device using thereof.

The inventors of the present disclosure have conducted various studies in order to achieve the above-described object. As a result, they have discovered that a stress concentration at diaphragm corners can be reduced by making a planar shape of the diaphragm substantially hexagonal, and by making all of interior angles thereof larger than approximately 90 degrees; that an increase in chip size due to (111) inclined portions in a through-hole and a reduction in chip strength can be prevented by having a structure in which the through-hole with vertical surfaces and inclined surfaces is formed by using a (110) silicon substrate; and that an effective area ratio of the diaphragm to a chip area can be improved by making a planar shape of a chip rhombic.

Specifically, a diaphragm structure of the present disclosure includes a through-hole formed so as to penetrate from an upper surface to a bottom surface of a substrate, and a vibrating electrode film formed on the upper surface of the substrate so as to cover the through-hole; and an opening shape of the through-hole in the upper surface of the substrate is substantially hexagonal.

In the diaphragm structure of the present disclosure, the substrate may be a silicon substrate.

In addition, a MEMS device of the present disclosure includes a through-hole formed so as to penetrate from an upper surface to a bottom surface of a substrate, a vibrating electrode film formed on the upper surface of the substrate so as to cover the through-hole, a fixed electrode formed above the substrate so as to oppose to the vibrating electrode film with an air gap being interposed therebetween, and a plurality of holes formed in the fixed electrode; and an opening shape of the through-hole in the upper surface of the substrate is substantially hexagonal.

In the MEMS device of the present disclosure, it is preferred that an interior angle of all corners of a substantially-hexagonal shape which is the opening shape of the through-hole may be larger than approximately 90 degrees.

In the MEMS device of the present disclosure, it is preferred that a plane orientation of the substrate is substantially (110), and that inner walls of the through-hole may have substantially-vertical surfaces and inclined surfaces with respect to the upper surface of the substrate.

In the MEMS device of the present disclosure, it is preferred that a plane orientation of the substrate may fall within a range of (110)±3 degrees, that an interior angle of two opposing corners of a substantially-hexagonal shape which is the opening shape of the through-hole may fall within a range of 109.4±3 degrees, and that an interior angle of other four corners of the substantially-hexagonal shape may fall within a range of 125.3±3 degrees.

In the MEMS device of the present disclosure, it is preferred that a planar shape of the substrate may be substantially rhombic. In this case, it is preferred that an interior angle of two opposing corners of a substantially-rhombic shape which is the planar shape of the substrate falls within a range of 70.6±3 degrees, and that an interior angle of other two corners of the substantially-rhombic shape falls within a range of 109.4±3 degrees.

In the MEMS device of the present disclosure, the substrate may be a silicon substrate.

In the MEMS device of the present disclosure, the MEMS device may be an acoustic sensor.

According to the present disclosure, in a diaphragm structure using in MEMS devices such as various sensors, a stress concentration at diaphragm corners is reduced, and thereby preventing a breakage of the diaphragm at the corners. In addition, an increase in chip size due to (111) inclined portions in a through-hole is prevented, while preventing a reduction in chip strength. Further, an effective area ratio of the diaphragm to a chip area can be improved.

According to the present disclosure, a MEMS device can be realized, in which the chip size can be reduced, while maintaining a sensitivity characteristic without downsizing the diaphragm.

As explained above, the present disclosure is useful in the realization of the excellent diaphragm structure for detecting the pressure variation, and the MEMS device using thereof.

DETAILED DESCRIPTION (First Embodiment)

A diaphragm structure (a diaphragm structure used for MEMS devices such as various sensors) according to a first embodiment of the present disclosure will be explained hereinafter with reference to the drawings.

Figure 1:
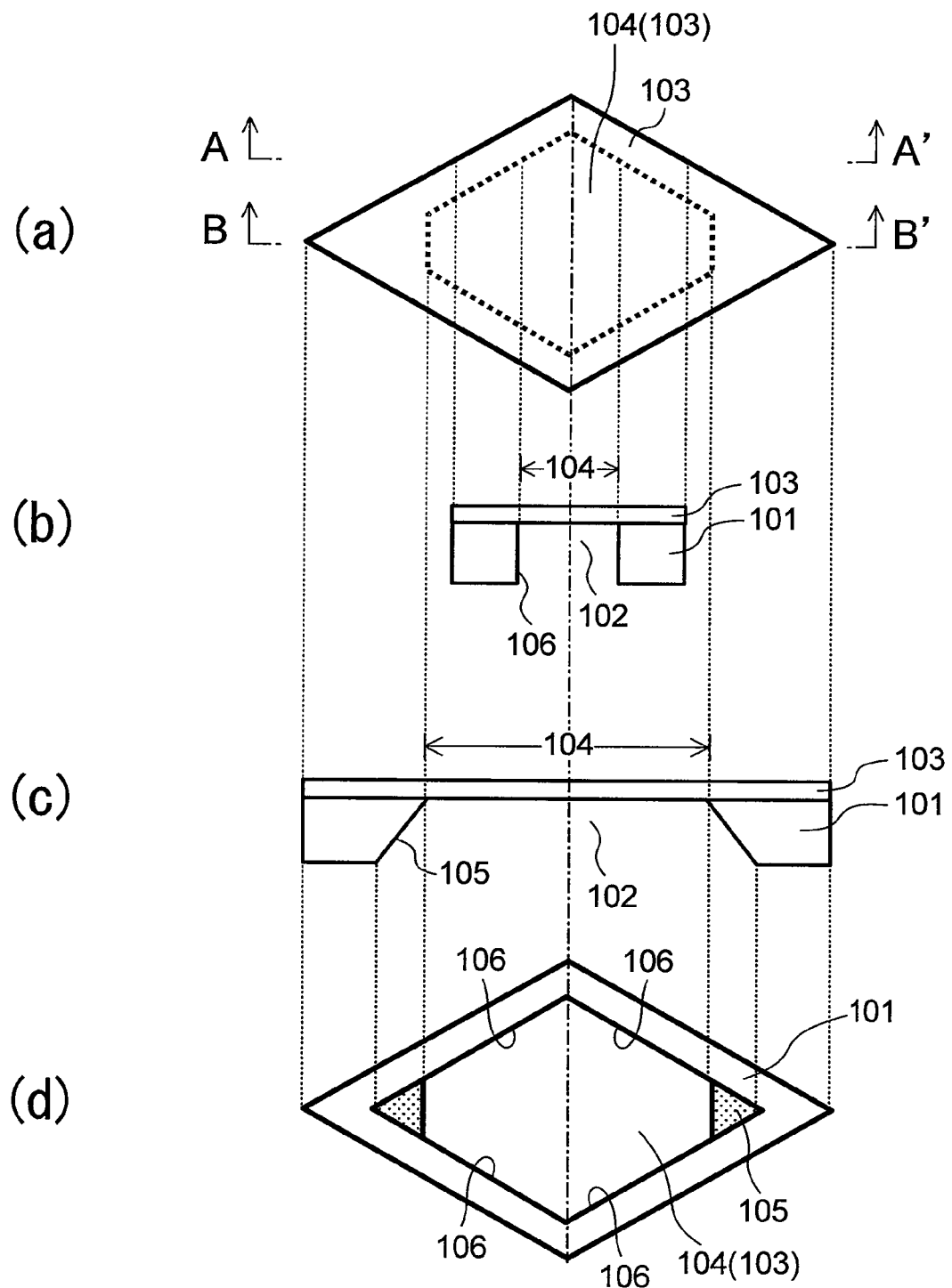
FIG. 1(a) is a top view of a diaphragm structure for a MEMS device according to a first embodiment of the present disclosure.
FIG. 1(b) is an A-A' cross-sectional view in FIG. 1(a).
FIG. 1(c) is a B-B' cross-sectional view in FIG. 1(a).
FIG. 1(d) is a bottom view of the diaphragm structure for the MEMS device according to the first embodiment of the present disclosure.

FIG. 1(a) is a top view of a diaphragm structure for a MEMS device according to the first embodiment of the present disclosure. FIG. 1(b) is an A-A' cross-sectional view in FIG. 1(a). FIG. 1(c) is a B-B' cross-sectional view in FIG. 1(a). FIG. 1(d) is a bottom view of the diaphragm structure for the MEMS device according to the first embodiment of the present disclosure.

As shown in FIGS. 1(a)-1(d), a through-hole 102 is formed so as to penetrate from an upper surface to a bottom surface of a substrate 101, e.g., a silicon substrate. A vibrating electrode film 103 is formed on the substrate 101 so as to cover the through-hole 102. A portion of the vibrating electrode film 103 positioned on the through-hole 102 (an area surrounded by a dashed line in FIG. 1(a)) functions as a diaphragm 104. Since the diaphragm 104 vibrates by an acceleration or pressure variation, the diaphragm 104 can be utilized for MEMS devices such as various sensors by electrically detecting such vibration displacement.

A feature of the present embodiment is that an opening shape of the through-hole 102 in the upper surface of the substrate 101 is substantially hexagonal. This makes a shape of the diaphragm 104 substantially hexagonal. In particular, an interior angle of all corners of the substantially-hexagonal diaphragm 104 is larger than approximately 90 degrees, and thereby reducing a stress concentration at the corners of the diaphragm 104. Consequently, a uniform vibration characteristic can be obtained. In addition, a breakage of the diaphragm at the corners can be prevented during fabricating or using the diaphragm.

The term "substantially-hexagonal shape" in the present disclosure means not only a hexagonal shape without rounded corners, but also a hexagonal shape with slightly-rounded corners due to a processing accuracy of a standard process technology.

In order to make the substantially-hexagonal diaphragm 104, e.g., a (110) plane oriented silicon substrate is used as the substrate 101. Specifically, e.g., a substantially-rhombic mask film is patterned and formed on the bottom surface side of the substrate 101, and an alkali etching is performed with an etching solution, e.g., KOH. Subsequently, while etching the (110) plane, a (111) plane which has an etching rate 50-100 times slower than that of the (110) plane is exposed. As the substantially-rhombic mask pattern, a mask pattern is used, in which, e.g., an interior angle of two opposing corners is set within a range of 70.6±1 degrees, and an interior angle of two remaining corners is set within a range of 109.4±1 degrees. The interior angle of the corners of the substantially-rhombic mask pattern is determined, considering an error in crystal plane upon a silicon substrate fabrication. If a slight performance degradation is acceptable, in the substantially-rhombic mask pattern, an interior angle of two opposing corners may be set within a range of 70.6±5 degrees, and an interior angle of two remaining corners may be set within a range of 109.4±5 degrees.

The term "substantially-rhombic shape" in the present disclosure means not only a rhombic shape without rounded corners, but also a rhombic shape with slightly-rounded corners due to a processing accuracy of a standard process technology.

As the alkali etching is progressed, (111) inclined surfaces 105 having an angle of approximately 35.3 degrees with respect to the (110) plane are formed in portions of the substrate 101 corresponding to areas of the interior angle of 70.6 degrees in the substantially-rhombic mask pattern, as inner walls of the through-hole 102. In other portions of the substrate 101, (111) substantially-vertical surfaces 106 vertical to the (110) plane are formed as the inner walls of the through-hole 102. Consequently, the etching is performed until the through-hole 102 eventually penetrates the silicon substrate 101, and thereby forming the substantially-hexagonal diaphragm 104 as shown in FIGS. 1(a) and 1(d). At this point, if a plane orientation of the substrate 101 which is, e.g., a silicon substrate falls within a range of (110)±1 degrees, an interior angle of two opposing corners of the hexagonal diaphragm 104 can be set within a range of 109.4±1 degrees, and an interior angle of other four corners can be set within a range of 125.3±1 degrees. If a slight performance degradation is acceptable, if a plane orientation of the substrate 101 which is, e.g., a silicon substrate falls within a range of (110)±5 degrees, an interior angle of two opposing corners of the hexagonal diaphragm 104 can be set within a range of 109.4±5 degrees, and an interior angle of other four corners can be set within a range of 125.3±5 degrees.

According to the diaphragm structure for the MEMS device in the present embodiment, the inner walls of the through-hole 102 has the vertical surfaces 106 and the inclined surfaces 105. Consequently, an increase in chip size due to the (111) inclined portions in the through-hole 102 can be prevented by the presence of the vertical surfaces 106, while preventing a reduction in chip strength by the presence of the inclined surfaces 105. Further, due to the presence of the vertical surfaces 106, an effective area ratio of the diaphragm 104 to a chip area can be improved. For example, if a diaphragm having the area of approximately 2.25 mm$^2$ (1.5 mm squared) is formed in a silicon substrate having the diameter of 6 inch and the thickness of 625 μm in the conventional example, approximately 7.76 mm$^2$ (2.79 mm squared) is required as the chip area, and the effective area ratio of the diaphragm to the chip area is approximately 29%. On the other hand, in the present embodiment, the diaphragm 104 having the area of approximately 2.25 mm$^2$ can be realized with the chip area of approximately 4.92 mm$^2$, and the effective area ratio of the diaphragm 104 can be improved to approximately 46% compared to the conventional example.

In the present embodiment, the planar shape of the substrate 101 is substantially rhombic, and thereby further improving the effective area ratio of the diaphragm 104 to the chip area. In particular, if the planar shape of the substrate 101 is the similar shape to that of the substantially-rhombic mask pattern, i.e., if the interior angle of the two opposing corners of the substantially-rhombic shape which is the planar shape of the substrate 101 is set within the range of 70.6±1 degrees, and the interior angle of the other two corners of the substantially-rhombic shape is set within the range of 109.4±1 degrees, the effective area ratio of the diaphragm 104 can be further improved. If a slight performance degradation is acceptable, an interior angle of the two opposing corners of the substantially-rhombic shape which is the planar shape of the substrate 101 may be set within a range of 70.6±5 degrees, and an interior angle of the other two corners of the substantially-rhombic shape may be set within a range of 109.4±5 degrees.

(Second Embodiment)

An acoustic sensor according to a second embodiment of the present disclosure will be explained hereinafter with reference to the drawings. The acoustic sensor according to the second embodiment is an acoustic sensor using the diaphragm structure for the MEMS device according to the first embodiment.

Figure 2:
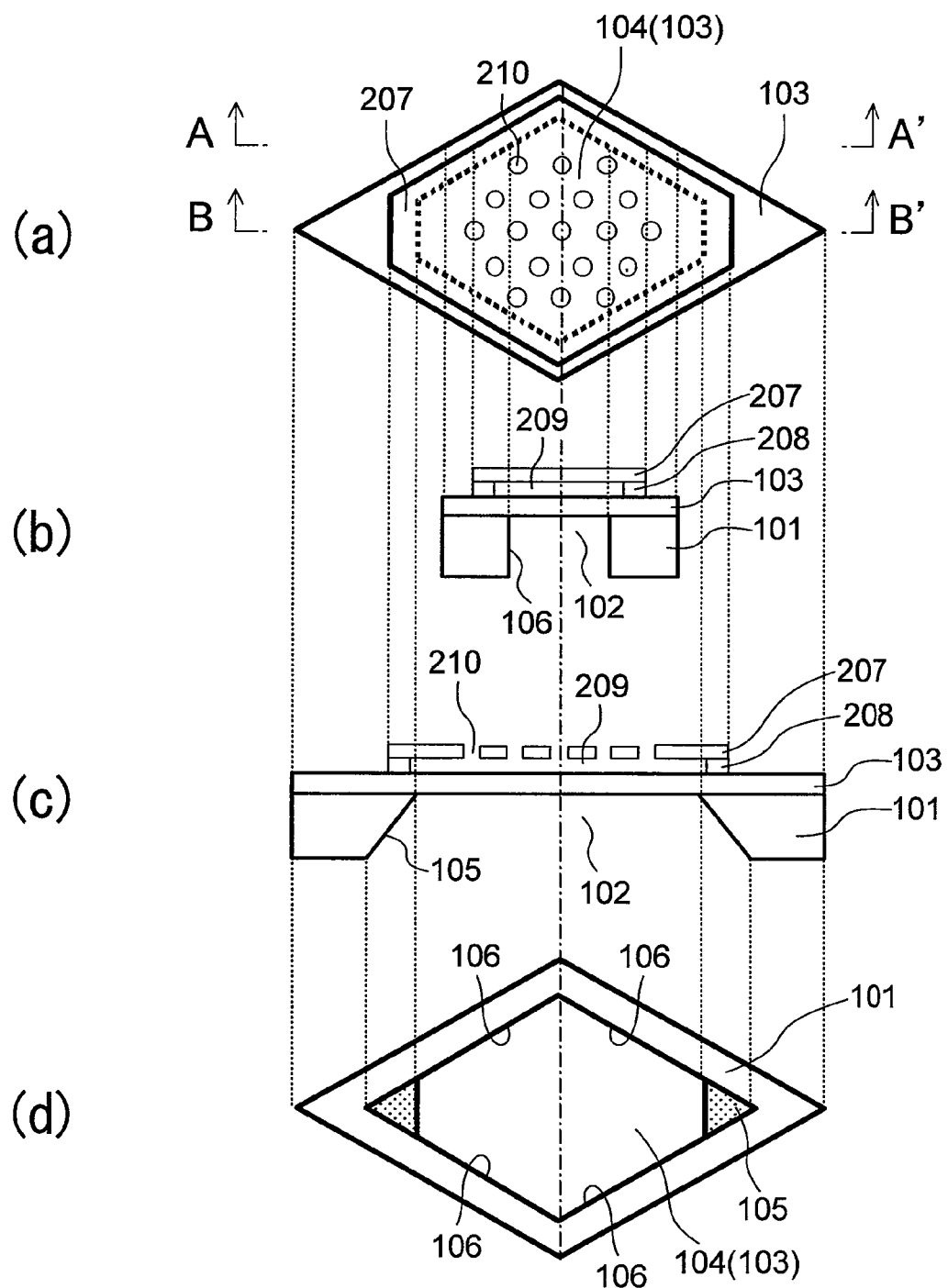
FIG. 2(a) is a top view of an acoustic sensor according to a second embodiment of the present disclosure.
FIG. 2(b) is an A-A' cross-sectional view in FIG. 2(a).
FIG. 2(c) is a B-B' cross-sectional view in FIG. 2(a).
FIG. 2(d) is a bottom view of the acoustic sensor according to the second embodiment of the present disclosure.
Figure 3:
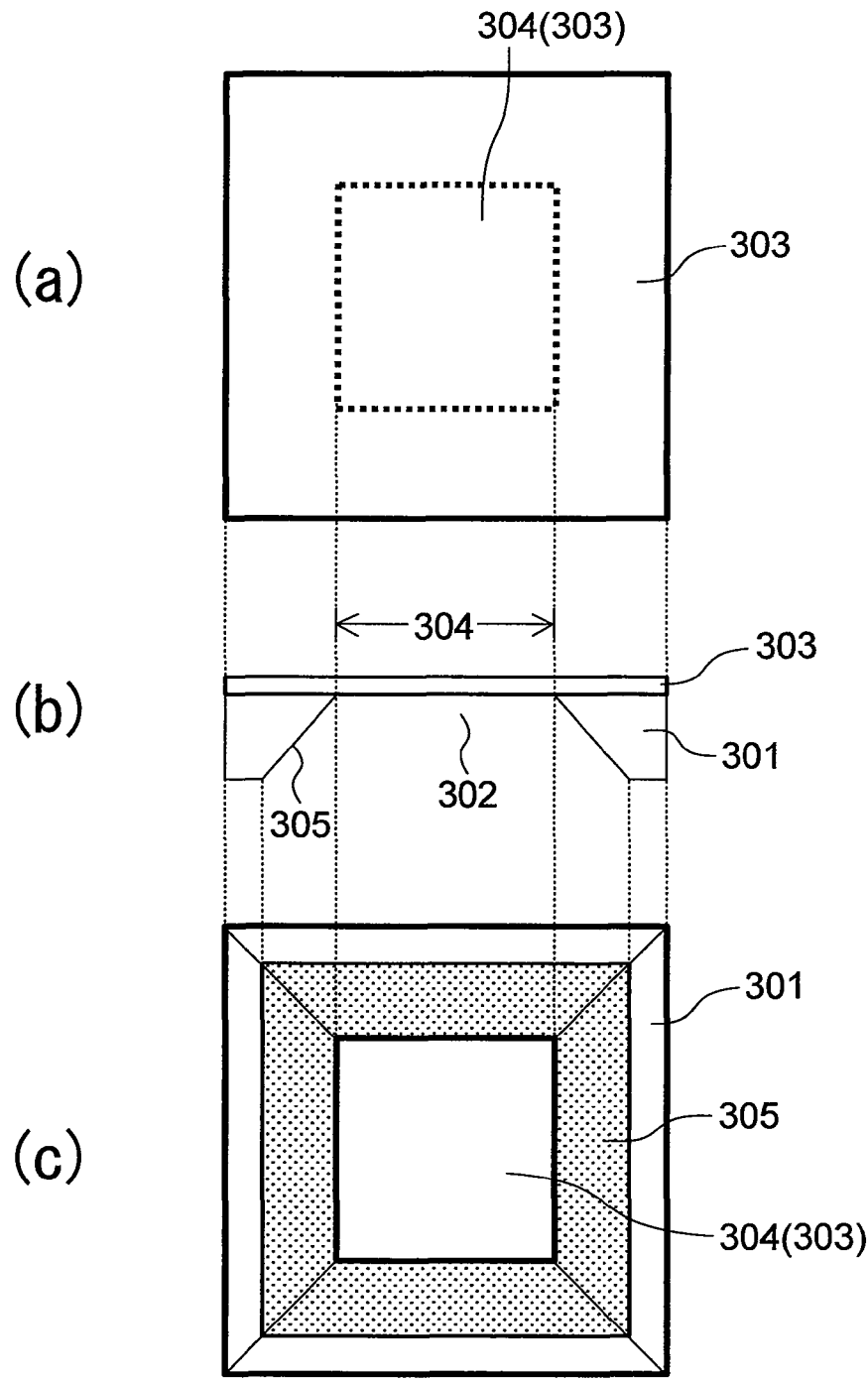
FIG. 3(a) is a top view of a conventional diaphragm structure for a MEMS device.
FIG. 3(b) is a cross-sectional view of the conventional diaphragm structure for the MEMS device.
FIG. 3(c) is a bottom view of the conventional diaphragm structure for the MEMS device.

FIG. 2(a) is a top view of the acoustic sensor according to the second embodiment of the present disclosure. FIG. 2(b) is an A-A' cross-sectional view in FIG. 2(a). FIG. 2(c) is a B-B' cross-sectional view in FIG. 2(a). FIG. 2(d) is a bottom view of the acoustic sensor according to the second embodiment of the present disclosure. In FIGS. 2(a)-2(d), the same reference numerals as those in the first embodiment shown in FIGS. 1(a)-1(d) are used to represent equivalent elements, and the explanation thereof will be omitted.

As shown in FIGS. 2(a)-2(d), a fixed electrode 207 is arranged above the substrate 101 so as to sandwich an air gap 209 which is set to a predetermined thickness by a spacer 208 between the fixed electrode 207 and the substantially-hexagonal diaphragm 104 (i.e., the vibrating electrode film 103) explained in the first embodiment. A plurality of holes 210 open in the fixed electrode 207. This allows the hexagonal diaphragm 104 to vibrate by a variation in pressure such as sound pressure through each of the holes 201, and thereby changing the thickness (distance) of the air gap 209. Such change in pressure is detected as a capacitance change of a condenser constituted by the vibrating electrode film 103 and the fixed electrode 207, and thereby functioning as the acoustic sensor.

According to the acoustic sensor of the present embodiment, the diaphragm structure for the MEMS device according to the present disclosure, i.e., the hexagonal diaphragm 104 is used, and a vibration characteristic distortion due to the stress concentration at the corners of, e.g., the conventional square diaphragm is dramatically reduced. Consequently, the good vibration characteristic can be obtained. Further, the diaphragm breakage at the corners during fabricating or using the diaphragm can be prevented. By making a part of the inner walls of the through-hole 102 the vertical surfaces 106, the increase in chip size can be prevented. In addition, by making a part of the inner walls of the through-hole 102 the (111) inclined surfaces 105, the chip frame strength can be retained. Further, by making the chip (substrate 101) shape substantially rhombic, the effective area ratio of the diaphragm 104 to the chip area can be improved, and thereby realizing the excellent acoustic sensor in which the chip size can be reduced, while maintaining the sensitivity characteristic without downsizing the diaphragm 104.

In the present embodiment, the acoustic sensor is explained as one example of the MEMS device using the diaphragm structure. However, it goes without saying that the MEMS device to which the diaphragm structure is applied is not limited to the acoustic sensor.

What is claimed is:

1. A diaphragm structure, comprising:
    a substrate having a through-hole formed so as to penetrate from an upper surface to a bottom surface of the substrate; and
    a vibrating electrode film formed on the upper surface of the substrate so as to cover the through-hole, wherein:
    an opening shape of the through-hole in the upper surface of the substrate is substantially hexagonal,
    the substrate is a silicon substrate, and
    an opening shape of the through-hole in the bottom surface of the substrate is substantially rhombic.

2. The diaphragm structure of claim 1, wherein
    inner walls of the through-hole have substantially vertical surfaces and inclined surfaces with respect to the upper surface of the substrate.

3. The diaphragm structure of claim 1, wherein a plane orientation of the substrate is substantially (110).

4. A MEMS device, comprising:
    a substrate having a through-hole formed so as to penetrate from an upper surface to a bottom surface of the substrate;
    a vibrating electrode film formed on the upper surface of the substrate so as to cover the through-hole;
    a fixed electrode formed above the substrate so as to oppose to the vibrating electrode film with an air gap being interposed therebetween; and
    a plurality of holes formed in the fixed electrode, wherein:
    an opening shape of the through-hole in the upper surface of the substrate is substantially-hexagonal,
    the substrate is a silicon substrate, and
    an opening shape of the through-hole in the bottom surface of the substrate is substantially rhombic.

5. The MEMS device of claim 4, wherein
    an interior angle of all corners of a substantially-hexagonal shape which is the opening shape of the through-hole is larger than approximately 90 degrees.

6. The MEMS device of claim 4, wherein
    a plane orientation of the substrate is substantially (110), and
    inner walls of the through-hole have substantially-vertical surfaces and inclined surfaces with respect to the upper surface of the substrate.

7. The MEMS device of claim 4, wherein
    a plane orientation of the substrate falls within a range of (110)±3 degrees,
    an interior angle of two opposing corners of a substantially-hexagonal shape which is the opening shape of the through-hole falls within a range of 109.4±3 degrees, and
    an interior angle of other four corners of the substantially-hexagonal shape falls within a range of 125.3±3 degrees.

8. The MEMS device of claim 4, wherein
    a planar shape of the substrate is substantially rhombic in a plan view.

9. The MEMS device of claim 8, wherein
    an interior angle of two opposing corners of a substantially-rhombic shape which is the planar shape of the substrate falls within a range of 70.6±3 degrees; and
    an interior angle of other two corners of the substantially-rhombic shape falls within a range of 109.4±3 degrees.

10. The MEMS device of claim 4, wherein
    the MEMS device is an acoustic sensor.

11. The MEMS device of claim 4, wherein:
    a plane orientation of the substrate is substantially (110),
    an interior angle of two opposing corners of a substantially-rhombic shape which is the opening shape of the through-hole in the bottom surface of the substrate falls within a range of 70.6±3 degrees, and
    an interior angle of other two corners of the substantially-rhombic shape falls within a range of 109.4±3 degrees.

12. The MEMS device of claim 4, wherein
    inner walls of the through-hole have substantially vertical surfaces and inclined surfaces with respect to the upper surface of the substrate.

13. The MEMS device of claim 4, wherein:
    inner walls of the through-hole has substantially vertical surfaces and inclined surfaces with respect to the upper surface of the substrate,
    the inclined surface are formed in portions of the substrate corresponding to two corners of the substantially-rhombic shape, and
    an interior angle of the two corners falls within a range of 70.6±3 degrees.

14. The MEMS device of claim 4, wherein
    the size of the through-hole in the upper surface of the substrate is smaller than the size of the through-hole in the bottom surface of the substrate.

* * * * *